United States Patent
Jahanbanifar et al.

(10) Patent No.: US 10,282,215 B2
(45) Date of Patent: May 7, 2019

(54) PARTIAL VALIDATION OF CONFIGURATIONS AT RUNTIME

(71) Applicants: Azadeh Jahanbanifar, Montreal (CA); Maria Toeroe, Montreal (CA); Ferhat Khendek, Montreal (CA)

(72) Inventors: Azadeh Jahanbanifar, Montreal (CA); Maria Toeroe, Montreal (CA); Ferhat Khendek, Montreal (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 51 days.

(21) Appl. No.: 15/529,643

(22) PCT Filed: Sep. 18, 2015

(86) PCT No.: PCT/IB2015/057212
§ 371 (c)(1),
(2) Date: May 25, 2017

(87) PCT Pub. No.: WO2016/083912
PCT Pub. Date: Jun. 2, 2016

(65) Prior Publication Data
US 2017/0329617 A1    Nov. 16, 2017

Related U.S. Application Data

(60) Provisional application No. 62/085,304, filed on Nov. 27, 2014.

(51) Int. Cl.
*G06F 9/00* (2006.01)
*G06F 9/24* (2006.01)
(Continued)

(52) U.S. Cl.
CPC ........ *G06F 9/44505* (2013.01); *G06F 9/5038* (2013.01)

(58) Field of Classification Search
None
See application file for complete search history.

(56) References Cited

U.S. PATENT DOCUMENTS 6,829,703 B1   12/2004   Caswell et al.
7,188,075 B1 *  3/2007   Smirnov ................ G06Q 10/06
                                                    705/7.35
(Continued)

OTHER PUBLICATIONS

Jahanbanifar et al., Partial Validation of Configurations at Runtime, 2015 IEEE 18th International Symposium on Real-Time Distributed Computing, pp. 288-291.
(Continued)

*Primary Examiner* — Mohammed H Rehman
(74) *Attorney, Agent, or Firm* — Julie Dufort; Ericsson Canada Inc.

(57) ABSTRACT

A system configuration is partially validated in response to requested changes to the system configuration. First, a reduced set of constraints is identified among a plurality of constraints of the system configuration. The reduced set of constraints place restrictions on attribute values and relations of changed entities to which the requested changes are applied. Each constraint of the reduced set is categorized based on leadership information that indicates an impact that a changed entity has on another entity with respect to the constraint. Each categorized constraint of the reduced set is validated to determine whether to accept, reject or modify the system configuration having the requested changes.

6 Claims, 7 Drawing Sheets

(51) Int. Cl.
*G06F 15/177* (2006.01)
*G06F 9/445* (2018.01)
*G06F 9/50* (2006.01)

(56) References Cited

U.S. PATENT DOCUMENTS

| | | | |
|---|---|---|---|
| 8,321,548 B2 | 11/2012 | Glendinning et al. | |
| 8,438,379 B2* | 5/2013 | Hoff | G06Q 10/06 713/100 |
| 8,935,203 B1* | 1/2015 | Brooker | G06F 13/28 707/610 |
| 2005/0044525 A1 | 2/2005 | Lazarov | |
| 2014/0143625 A1* | 5/2014 | Watanabe | G06F 11/008 714/741 |
| 2014/0149732 A1* | 5/2014 | Sanner, III | G06F 9/4405 713/2 |
| 2018/0004670 A1* | 1/2018 | Sudhir | G06F 12/0862 |

OTHER PUBLICATIONS

I. Warren et al., An Automated Formal Approach to Managing Dynamic Reconfiguration, 21st IEEE International Conference on Automated Software Engineering (ASE'06), 2006, 10 pages.
P. Goldsack et al., The SmartFrog Configuration Management Framework, SIGOPS Oper. Syst. Rev., vol. 43, 2009. pp. 16-25.
M. Burgess et al., Modeling Next Generation Configuration Management Tools, 20th Large Installation System Administration Conference (LISA '06), 2006, pp. 131-147.
A. Konstantinou et al., Towards Self-Configuring Networks, in DANCE'02: DARPA Active Networks Conference and Exposition, 2002, pp. 1-14.
L. Akue et al., Runtime Configuration Validation for Self-configurable Systems, IFIP/IEEE International Symposium on Integrated Network Management (IM), 2013, pp. 712-715.
L. Akue et al., Integrating an Online Configuration Checker with Existing Management Systems: Application to CIM/WBEM Environments, 9th CNSM 2013: Workshop SVM 2013, pp. 339-344.
L. Akue et al., A Model-Based Approach to Validate Configurations at Runtime, VALID 2012: The Fourth International Conference on Advances in System Testing and Validation Lifecycle, pp. 133-138.
J. Cabot et al., Incremental integrity checking of UML/OCL conceptual schemas, The Journal of Systems and Software 82 (2009), Elsevier, pp. 1459-1478.
J. Cabot et al., Computing the Relevant Instances That May Violate an OCL Constraint, O. Pastor and J. Falcao e Cunha (Eds.): CAiSE 2005, LNCS 3520, pp. 48-62.
G. Bergmann et al., Incremental Evaluation of Model Queries over EMF Models, D.C Petriu, N. Rouquette, O. Haugen (Eds.): MODELS 2010, Part I, LNCS 6394, pp. 76-90.
I. Groher et al., Incremental Consistency Checking of Dynamic Constraints, D. S. Rosenblum and G. Taentzer (Eds.): FALSE 2010, LNCS 6013, pp. 203-217.
A. Reder et al., Incremental Consistency Checking for Complex Design Rules and Larger Model Changes, R.B. France et al. (Eds.): MODELS 2012, LNCS 7590, pp. 202-218.
International Search Report from corresponding application PCT/IB2015/057212.

* cited by examiner

PARTIAL VALIDATION OF CONFIGURATIONS AT RUNTIME

CROSS-REFERENCE TO RELATED APPLICATIONS

This application claims the benefit of U.S. Provisional Application No. 62/085,304 filed on Nov. 27, 2014.

TECHNICAL FIELD

Embodiments of the invention relate to runtime system configuration management.

BACKGROUND

A system configuration is a set of configuration entities, and their relations to each other. The configuration defines the arrangement and the order that the system is to obey. At runtime the configuration may need to be modified by different actors to meet certain/new requirements or respond to performance degradations or upgrade purposes. The reconfiguration has to respect the consistency rules of the configuration to avoid service outage. The consistency rules include a set of structural integrity requirements and application/domain constraints.

The capability of runtime configuration validation is a prerequisite for self-managing systems with dynamic reconfiguration capabilities (e.g., the cloud) as these systems need to detect any potential inconsistencies. The capabilities of runtime validation and dynamic reconfiguration are especially needed in systems with high availability (HA) requirements. It is not acceptable to shut down or restart HA systems due to the need for validation and/or reconfiguration.

Preserving the configuration consistency is a main functionality of a validation module of a system. It is desired that real-time systems provide this functionality at runtime with minimal overhead, e.g., by performing the minimum needed checks. However, configurations may consist of hundreds of entities, with complex relations and constraints. Thus, validation time can grow to the extent that it becomes impractical to perform runtime configuration validation.

In this context, most of the research studies focus on the structural checking of the functional configuration parameters (e.g., type correctness, checking the validity of the values of the system entities' attributes with respect to the constraints of each entity and the relation between the entities). These solutions either are platform-dependent or focus on the correctness of the runtime validation.

SUMMARY

There is a need for a low-overhead runtime validation mechanism to check the modifications against the consistency rules of the system. In one embodiment, a method is provided for validating a system configuration by partially validating requested changes to the system configuration. The method comprises: identifying a reduced set of constraints among a plurality of constraints of the system configuration, wherein the reduced set of constraints place restrictions on attribute values and relations of changed entities to which the requested changes are applied; categorizing each constraint of the reduced set based on leadership information that indicates an impact that a changed entity has on another entity with respect to the constraint; and validating each categorized constraint of the reduced set to determine whether to accept, reject or modify the system configuration having the requested changes.

In another embodiment, a system is provided for validating a system configuration by partially validating requested changes to the system configuration. The system comprises: a memory and processing circuitry coupled to the memory. The processing circuitry is adapted to: identify a reduced set of constraints among a plurality of constraints of the system configuration, wherein the reduced set of constraints place restrictions on attribute values and relations of changed entities to which the requested changes are applied; categorize each constraint of the reduced set based on leadership information that indicates an impact that a changed entity has on another entity with respect to the constraint; and validate each categorized constraint of the reduced set to determine whether to accept, reject or modify the system configuration having the requested changes.

In yet another embodiment, a system is provided for validating a system configuration by partially validating requested changes to the system configuration. The system comprises: an identifying module adapted to identify a reduced set of constraints among a plurality of constraints of the system configuration, wherein the reduced set of constraints place restrictions on attribute values and relations of changed entities to which the requested changes are applied; a categorizing module adapted to categorize each constraint of the reduced set based on leadership information that indicates an impact that a changed entity has on another entity with respect to the constraint; a validating module adapted to validate each categorized constraint of the reduced set to determine whether to accept, reject or modify the system configuration having the requested changes.

DETAILED DESCRIPTION

Figure 1:
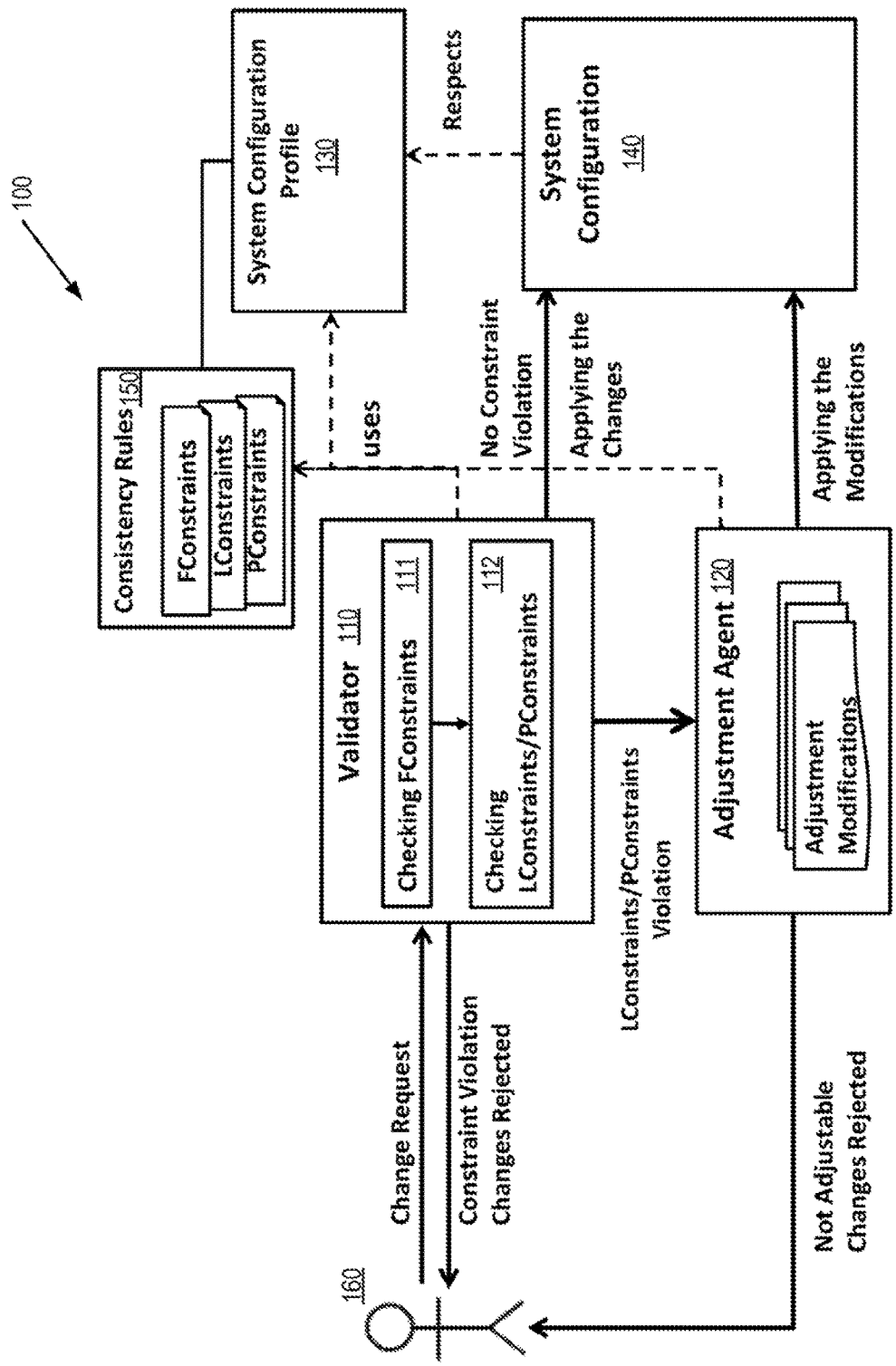
FIG. 1 illustrates a model based framework for managing changes to a system configuration according to one embodiment.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

In some alternate implementations, the functions/acts may occur out of the order noted in the sequence of actions. Furthermore, in some illustrations, some blocks may be optional and may or may not be executed.

Embodiments of the invention provide a model based approach to configuration management, with partial validation of the configuration to reduce the validation time and overhead. The output of the partial validation serves as input for an auto-adjustment function module which performs corrective actions to remove the potential inconsistencies.

The partial validation described herein is performed at runtime. Runtime reconfigurations, either proposed as a change of a single system entity or as a bundle of changes affecting a number of entities, often target only parts of the configuration. Thus, when the changes impact a limited portion of the configuration, partial validation is sufficient for validating a runtime reconfiguration and guarantees the consistency of the configuration in the same way as complete validation does. Partial validation not only guarantees the correctness of the changed configuration with respect to the consistency rules, but also performs a minimal checking to keep the validation time acceptable for the system especially in real-time or highly available systems.

The following description presents a configuration management framework and explains the role of partial validation for dynamic reconfiguration in this framework. One solution for partial validation, as described herein, follows the model driven paradigm using a Unified Modeling Language (UML) profile and Object Constraint Language (OCL) constraints.

In systems where the configuration generation and maintenance follow a systematic approach, a configuration schema is used to specify the structure of the system configuration entities and their relations. In one embodiment, a configuration schema can be defined using a Domain Specific Language (DSL) or a general purpose modeling language. In one embodiment, the UML and its profiling mechanism are chosen for defining the configuration schema, although in alternative embodiments different languages and profiling mechanisms may be used. The consistency rules coming from the application domain may be expressed as constraints. The constraints restrict the entities and their relations by governing both their structure and behavior to preserve the well-formedness of the configuration model. The consistency rules of the system configuration can be captured using the OCL and added to the configuration profile. A valid configuration model conforms to the configuration profile; therefore, the validity of the configuration model is checked against this configuration profile.

According to an embodiment, the OCL is extended with role definitions. These roles are defined for the entities participating in an OCL constraint. The extensions provide information about the roles of the constrained entities of a constraint with respect to each other. This information, in turn, allows filtering and categorizing the constraints of the configuration profile with respect to a modification request. By selecting only the relevant constraints (i.e., relevant to the changed entities), the number of constraints needing to be checked is reduced. Thus, validation time and overhead are reduced compared to a complete validation, in which all constraints are checked.

A system configuration is a set of configuration entities and their relations to each other. These configuration entities are logical representations of the system resources. The configuration defines the arrangement and the order that the system obeys. The definition and granularity of the configuration entities depend on the system domain and its requirements. Components, groups of components, sub-systems, virtual machines, and hardware elements are examples of the resources the configuration entities represent. A configuration schema can be used to define the correct structure of the configuration entities and their relations at a higher level of abstraction. A system's configuration is an instance of this schema. The consistency rules are restrictions imposed on the configuration entities and the relations between them. They may also represent semantics of the application domain. The rules are part of the schema. A configuration is considered valid and correct if it respects its schema.

In HA systems, configuration change requests may come at runtime from different actors. These requests cause the system configuration to be changed. The changes are validated before being applied to the system such that the consistency of the configuration is not violated and negative impacts on the system can be avoided.

In one embodiment, the validation takes place in two steps: the Legitimacy check and the Integrity check. Both aim to find the rules that are violated by the requested changes. The difference between the two is the type of the constraints they check. If a Legitimacy rule is violated by the requested modification, the modification is rejected immediately. A successful Legitimacy check is followed by the Integrity check. Violating an Integrity rule does not result in an immediate rejection of the modification request. The reason is that the change may be incomplete and the inconsistency might be resolved by an auto-adjustment agent (also referred to as an adjustment agent). The auto-adjustment agent attempts to resolve the Integrity rule violation through additional modifications that satisfy the Integrity and Legitimacy rules by construction. Because the violated rules are the basis of the auto-adjustment of the configuration, the additional modifications are safe and sufficient. Thus, no further checks are needed after the auto-adjustment.

The runtime configuration validation is performed to facilitate dynamic reconfigurations. The validation process identifies the violated rules and the affected entities. The auto-adjustment agent uses this information to find a resolution.

FIG. 1 illustrates a model based framework 100 for managing changes to a system configuration 140 according to one embodiment. The framework 100 includes a configuration validator 110 to validate the change requests submitted by an administrator or management applications 160. The framework 100 also includes an adjustment agent 120 that finds complementary modifications, if any exist, to resolve the potential inconsistencies detected by the validator 110. In one embodiment, the system configuration 140 may be validated by the validator 110 using a partial validation approach, which prunes unnecessary constraints and thus reduces the cost and time of validation. The result of the partial validation may be used by the adjustment agent 120, which, whenever possible, automatically adjusts the configuration in case of detecting constraint violations.

The system configuration model used for the configuration change management is briefly explained below. In one embodiment, the UML and its profiling mechanism are used to define a configuration schema, which captures the concepts and relations of the system configuration 140 in a system configuration profile 130. System constraints, in the form of consistency rules 150, are added to the profile 130 as OCL constraints to capture the semantics and additional restrictions. The relations and dependencies between the configuration entities or attributes indicate that some of them have a determining role and lead the others especially during configuration changes. In one embodiment, the constraints may be enriched by adding the leadership information to express the way the constrained entities may impact each other. More specifically, the leader, follower, and peer roles are defined for the constrained entities to indicate the influence of the entities on each other, e.g., in a constraint the leader entities have influence over the other follower entities. In other constraints, peer entities have equal effect on each other. In one embodiment, the consistency rules 150 include three categories of constraints, LConstraints, FConstraints and PConstraints, where the prefix "L" represents the leader, "F" represents the follower and "P" represents the peer. The formation of the three constraint categories will be explained in further detail in connection with FIG. 6 and Algorithm_1.

In the following, an extension to the constraints and the use of the extension in the validation process are explained. The constraints are restrictions on the attribute values of the configuration entities, their behaviors and relations. They are defined when the configuration schema is designed to reflect the requirements of the system or application domain. Subsequently, they are taken into account in the configuration generation process to ensure the consistency of the resulting configuration.

OCL is a declarative language that describes the constraints for UML models and profiles. It specifies what conditions are to be met by the entities involved in the OCL expressions rather than defining how it is achieved. Although the standard OCL is suitable for many applications, it may sometimes be insufficient. Therefore, it is useful to extend OCL to add more information to the constraints. The configuration constraints can also be enriched by OCL extension. A constraint places some restriction on an entity or entities. The roles of these entities may not be equal, that is, some entities in the constraint can have influence over the others. These dominant and dominated roles of entities in a constraint cannot be expressed by standard OCL. However, knowing these roles can help in identifying the constraints that need to be checked and the order in which they need to be checked.

An example explaining the leadership concept and constraints is provided below, before further details of FIG. 1 are described. To demonstrate the extension to the OCL constraints and its usage, an example is presented in relation to the Open Virtualization Format (OVF) defined by the Distributed Management Task Force (DMTF). OVF is a packaging standard, which describes an extensible format for packaging and distribution of software products for virtual systems. It enables the cross-platform portability by allowing software vendors to create a single, pre-packaged appliance. Different choices of virtualization platforms for running the packaged appliance are therefore available.

Figure 2:
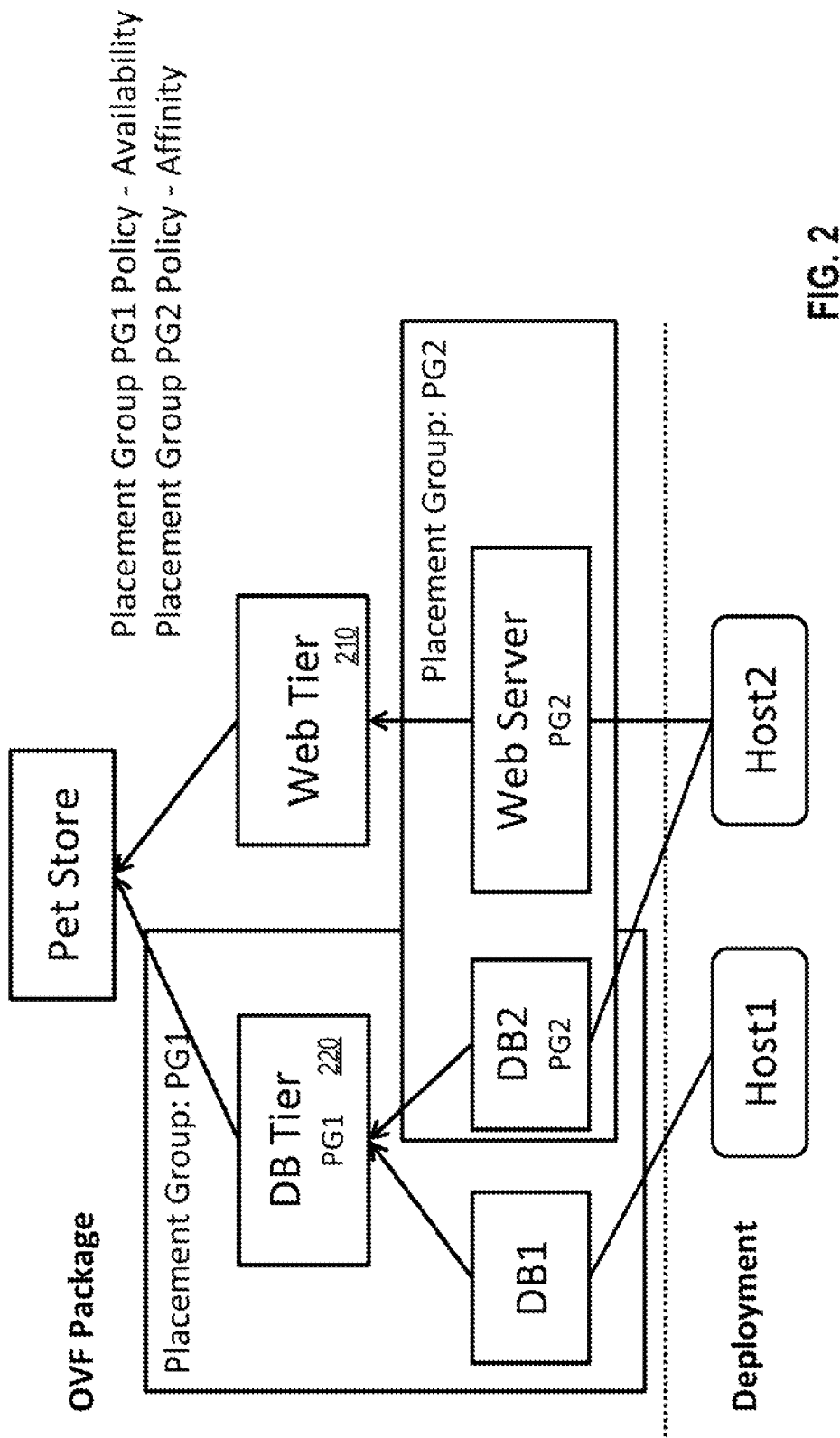
FIG. 2 illustrates a Pet Store example and its deployment according to one embodiment.

FIG. 2 illustrates a Pet Store example and its deployment according to one embodiment. The upper part of FIG. 2 shows the structure of a simple two-tiered Pet Store example. It consists of a Web Tier 210 and a Database (DB) Tier 220. The Web Tier 210 includes one Virtual System (Web Server) and the DB Tier 220 includes two Virtual Systems (DB1, and DB2) for fault tolerance. Three Virtual Systems (Web Server, DB1, and DB2) and three Virtual System Collections (Pet store, Web Tier 210, and DB Tier 220) are included in the Pet Store OVF package.

The OVF package definition allows for the specification of proximity requirements for the deployment of Virtual Systems in a given scope (e.g., host, rack, etc.) through the definition of Placement Group policies for the Virtual Systems and Virtual System Collections:

Affinity Policy: It is used to specify that two or more Virtual Systems are to be deployed closely together, because, for example, they need fast communication.

Availability Policy: It is used to specify that two or more Virtual Systems are to be deployed separately because of HA or disaster recovery considerations.

For instance, in the illustrated Pet Store example of FIG. 2, the DB Virtual Systems are to be deployed on different hosts for fault tolerance. Thus, the PG1 Placement Group with the availability policy is specified for the Virtual System Collection of the DB Tier 220. PG1 is defined as a property of the DB Tier 220. On the other hand, the DB2 and Web Server Virtual Systems are to be deployed on the same host for fast communication; the PG2 Placement Group with affinity policy is specified for the two Virtual Systems. Similarly, PG2 is defined as a property for the DB2 and Web Server Virtual Systems.

Figure 3:
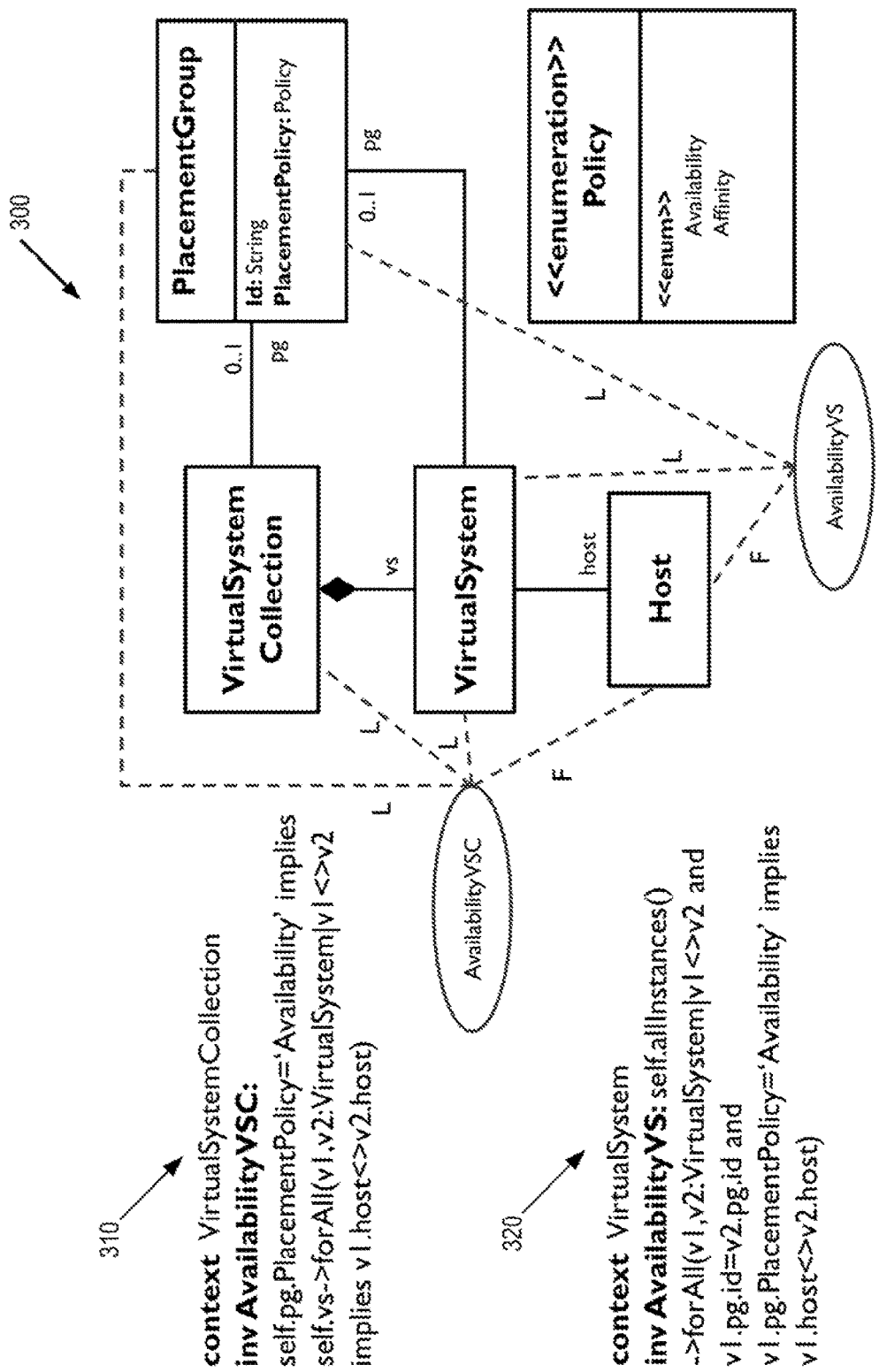
FIG. 3 illustrates the relation between the entities of a simplified domain model according to one embodiment.

FIG. 3 illustrates the relation between the entities of a simplified OVF domain model 300 according to one embodiment. The restrictions that the policies are imposing on the deployment of Virtual Systems can be expressed with OCL constraints 310 and 320 included in the figure.

It is noted that OVF allows defining a combination of availability and affinity policies for the Virtual Systems and their Collections. Referring again to the bottom part of FIG. 2, at deployment time the Virtual Systems with their Placement Groups dictate how they are to be deployed on the Hosts. Note that the Placement Group may be defined for the Virtual System (e.g., in the Web Server Virtual System) or inherited from the parent Virtual System collection (e.g., DB1 Virtual System) or a combination of these two cases (e.g., DB2 Virtual System). The DB Tier 220 has a Placement Group PG1 which itself has the "availability" policy, thus all the Virtual Systems of DB Tier 220 (DB1, DB2) are to be hosted on different Hosts (Host1 and Host2). On the other hand, the Placement Group (PG2) defined for Virtual Systems of DB2 and Web Server has the "affinity" policy; thus the two Virtual Systems are to be placed on the same Host (Host2). An OCL constraint can capture part of the restrictions on the relation between the Virtual Systems and their Host(s) imposed by the Placement Group policies. However, an OCL constraint (without the extensions) cannot capture the role of the Virtual Systems in the constraint as the ones which affect the Host entity selection.

According to one embodiment, an extension to OCL is provided by defining roles for the constrained entities to show the influence of some entities over others in the constraint. Considering the semantic of the relations between the entities, a leadership flow can be identified between them. In other words, in a constraint with multiple entities involved, changes in some entities may impact the others.

In the example of FIG. 2, there is a constraint between the Virtual System and the Host entities. The Virtual System entity is the one that has the Leader role and drives the Host entity; that is, the Follower. This means that if the Virtual System entity (including its Placement Group) changes and the constraint becomes violated, the Host of the Virtual System needs to change to follow the Virtual System change in order to satisfy the constraint. On the other hand, if the Host of the Virtual System tries to change and this change violates the constraint, the Virtual System and its Placement Group cannot be changed as the role semantic does not allow the leader entity to adjust to the changes of the follower entities. For instance, in the Pet Store example the DB Tier 220 (i.e., DB1, DB2) and the Web Server are the leader entities while Host1 and Host2 are the followers. Assume that Host1 fails. Since PG1 does not allow the collocation of DB1 and DB2, DB1 cannot be re-deployed. On the other hand if the Placement Group of the DB Tier is changed from PG1 to PG2, this change of the leader results in changing the Host entity (follower) which means now DB1 and DB2 are to be placed on the same Host (e.g., Host1 or Host2).

The role definitions for the entities depend on the semantic of the relation. Thus, for some constraints the entities may have equal influence over each other. Such entities are called Peer entities.

Figure 4:
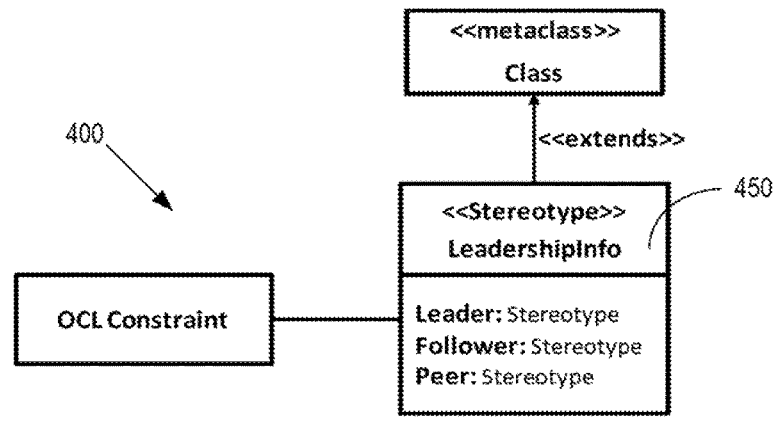
FIG. 4 illustrates an extension of constraints with leadership information according to one embodiment.

FIG. 4 illustrates an extension 450 of the constraints with the leadership information according to one embodiment. This extension 450 is added to the OCL to enrich the constraints without changing the internal OCL grammar and metamodel, so the parsers and validators designed for the standard OCL remain usable. The OCL with the extension is hereinafter referred to as a constraint profile 400. The following description explains how the constraint profile 400 is used for partial validation.

It is worth mentioning that the roles of the constrained entities may change with the application scenario. More specifically, the leader/follower/peer roles may be defined for the entities for the initial design time of a configuration to meet the setup and deployment requirements (e.g., similar to the Pet Store example). However, after the system is deployed and the requirements change, the allowable changes may be limited. For example, due to budget reasons, no new hosts can be added to the system and, as a result, the Virtual Systems (including the software products) need to adapt and follow the Host restrictions in this respect. This means that now the Host entity becomes a leader and the Virtual System and Virtual System collection become followers, although the standard portion of the OCL constraint between them remains unchanged. Defining the roles for the entities through the leadership information has the advantage that the roles can be defined and changed whenever necessary without affecting the constraints themselves.

A partial validation approach is presented in the following description. To validate a configuration model, its conformance to the configuration profile is checked. The profile defines the stereotypes, their relations (i.e., the structure of the model) along with a set of constraints over these stereotypes and relations, which assure well-formedness. Conventionally, when a request for changing some entities of the configuration model is received, the whole model is checked to make sure that the modified model respects the structure and the constraints of its profile. This full validation can be a time and resource consuming process. Such overhead is not desirable in live systems, especially if they are real-time or highly available systems. To reduce the overhead and improve the system performance, a partial validation is performed that minimizes the number of constraints and/or configuration entities to be checked. In one approach, the number of constraints to be checked is minimized based on the requested changes. This also leads to the reduction of the number of configuration entities that need to be checked. This is because the validator 110 (FIG. 1) checks only the entities whose stereotypes are involved in the selected constraints. This new set of configuration entities include at least the changed entities and the ones related to them through their constraints. It is noted that the constraints are validated for all relevant entities of the modified system configuration. This is because the constraints are defined at the metamodel level, while the configuration is at the model level and can have multiple instances of each stereotype.

Validation overhead can be reduced when the constraint and entity selection time is negligible compared to the time saving achieved by partial validation. However, in cases where the modification request includes entities of many different stereotypes, the number of constraints that need to be selected is considerable and the constraint selection may not be worthwhile anymore. Another case when partial validation is less efficient is when a few constraints are selected to be checked against a large number of configuration entities composing the major part of the configuration. Thus, a threshold may be identified at which, for a set of changes, the time needed for the constraint and entity selection for the partial validation and the partial validation itself exceeds the time of a full validation. This threshold depends on several factors such as the size of the configuration model, the number of instances of each stereotype, and the number of constraints. In some cases, the partial validation that uses constraint selection alone is already more efficient than full validation.

The constraint selection is based on the modification request and it provides that only the relevant constraints are selected for checking. The constraints are filtered to form a reduced set of constraints, and the selected constraints are categorized based on the role of the changed entities in the constraints.

Figure 5:
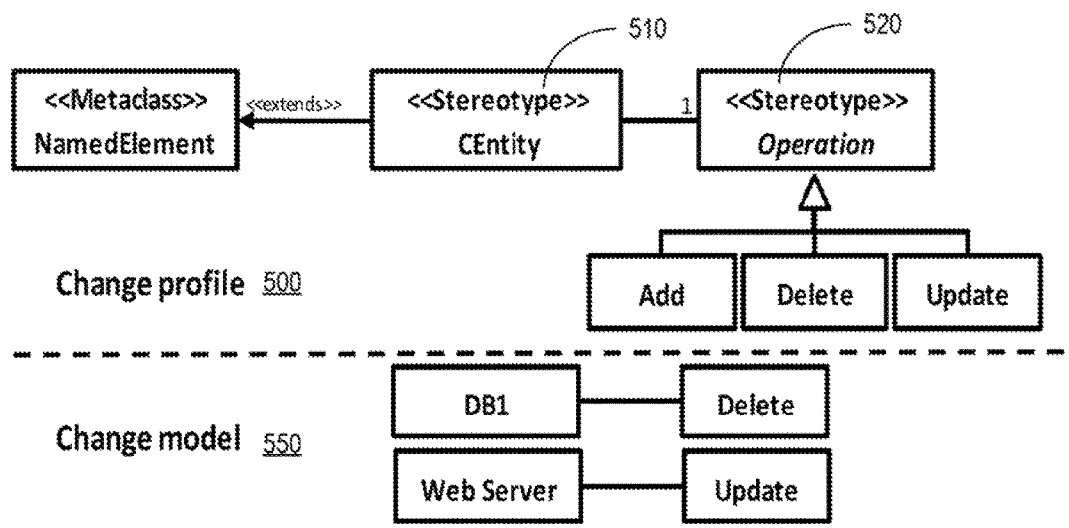
FIG. 5 illustrates a change profile and an example change model according to one embodiment.

In one embodiment, leadership information that was added to the constraints may be used to filter the constraints such that the reduced set of constraints can be identified. The filtering is based on the modification request of a system actor. Assume that a request may consist of many changes, each of which applies to one or more entities of the configuration model. These changes are called the change set. The configuration entities of the change set can be represented in a model that conforms to a change profile. FIG. 5 illustrates a change profile 500 and an example change set according to one embodiment. The change profile 500 has a stereotype called CEntity 510 which extends the NamedElement metaclass of UML. The CEntity stereotype 510 is to represent those entities of the configuration model that are requested to be changed. In the Pet Store example of FIG. 2, the configuration model may have an entity called Web Server which needs to be changed (updated), and another entity called DB1 which needs to be deleted. A change model 550 represents the needed changes to the configuration model. The operation requested on the model entities is represented by Operation stereotype 520 in the change profile 500. It is specialized as the Add, Update, and Delete stereotypes. Regardless of the requested operation, the constraints in which the entity is involved are checked. Such a change model 550 is one of the inputs to the constraint filtering process.

Having the change model 550 and the configuration profile (e.g., the system configuration profile 130 of FIG. 1), the stereotypes applied on each changed entities can be identified, which are the stereotypes of the configuration profile and also the CEntity stereotype 510. For the validation, these stereotypes of the configuration profile are considered. The constraints of the configuration profile are defined over these stereotypes and their roles are captured through the leadership concept. Therefore, by looking up the stereotypes of the changed entities, the validator 110 of FIG. 1 can select the constraints of the configuration profile that have the same stereotypes as the stereotypes applied to the entities of the change model 550 and that include the leadership role in the profile.

Algorithm_1 describes a filtering process and the categorization of the filtered constraints according to the role of the changed entities in the constraints. The output of the algorithm are the filtered and categorized constraints. The algorithm starts with four empty sets (models): A, LConstraintModel, FConstraintModel, PConstraintModel. Set A collects the stereotypes of all changed entities (lines 6 to 8). For each constraint in the ConstraintModel, its LeadershipInfo is considered and the Leader/Follower/Peer stereotypes are compared with the stereotypes of set A. If a common stereotype is found, then the constraint is added to one of the sets of LConstraintModel, FConstraintModel, PConstraintModel, while making sure each constraint is added only to one of the output constraint models (line 10 to 19).

Figure 6:
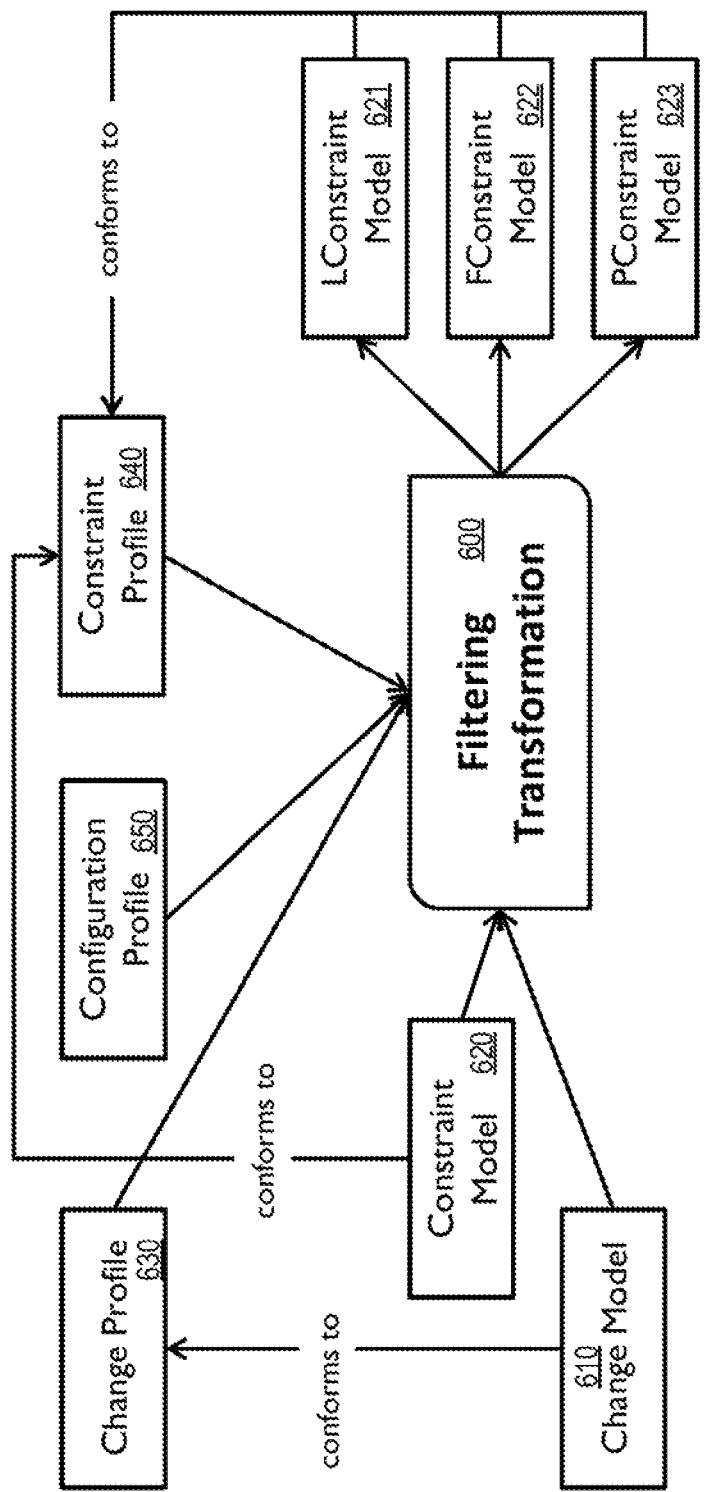
FIG. 6 illustrates an example of filtering transformation and categorization according to one embodiment.

The filtering process of Algorithm_1 can be implemented using a transformation model. An example of Filtering Transformation 600 is illustrated in FIG. 6, according to one embodiment. The filtering transformation 600 not only filters the constraints but also categorizes the filtered constraints based on the roles of the changed entities in the constraints. More specifically, the filtering transformation 600 takes a change model 610, a constraint model 620, and a configuration profile 650 as input, and selects (i.e., filters) the relevant constraints and classifies them into the three constraint models (LConstraintModel 621, FConstraintModel 622, PConstraintModel 623) as output. The change model conforms to a change profile 630. The constraint model 620, LConstraintModel 621, FConstraintModel 622, and PConstraintModel 623 conform to a constraint profile 640.

---

Algorithm_1 Filtering and Categorizing the constraints

---

Input: ConfigurationProfile, ConstraintModel, ChangeModel
Output: LConstraintModel, FConstraintModel, PConstraintModel
 1: A := { }
 2: LConstraintModel:= { }
 3: FConstraintModel:= { }
 4: PConstraintModel:= { }
 5: // Find all the stereotypes applied to the entities of the ChangeModel
 6: for each ENTITYj in ChangeModel do
 7:   A:= A ∪{ENTITYj.getAppliedStereotypes( )}
 8: end for
 9: //Filtering and categorizing constraints of the ConstraintModel
10: for each CONSTRAINTi in ConstraintModel do
11:   K:=CONSTRAINTi->LeadershipInfo
12:   if {K.Leader}∩ A ≠ { } then
13:     LConstraintModel:= LConstraintModel∪ {CONSTRAINTi}
14:   else if {K.Follower}∩ A ≠ { } then
15:     FConstraintModel := FConstraintModel∪ {CONSTRAINTi}
16:   else if {K.Peer}∩ A ≠ { } then
17:     PConstraintModel := PConstraintModel∪ {CONSTRAINTi}
18:   end if
19: end for

---

If the applied stereotype on a changed entity (in the change model 610) has a leader role in a constraint, that constraint is added into the LConstraint category. Similarly, if the stereotype of another changed entity has the follower role in a constraint, that constraint is added to the FConstraint category. The PConstraint category is defined similarly for the constraints whose entities have a peer role in the constraint and also appear in the change model 610. This categorization is shown in the example of FIG. 6.

In one embodiment, the three constraint categories do not have any intersection (i.e., no common constraint between each two categories). Otherwise, if a constraint happens to be in two categories, the validation process would check the constraint twice and would contradict with reducing the number of constraint checking. Therefore, in cases where a constraint can be categorized in more than one category, a choice of only one category is made. An example of such a case is when both the leader and follower entities of a constraint are changed within the same change set. For instance in the Pet Store example, when a request changes an instance of the DB Tier 220 (leader) and an instance of the Host (follower) in the same change set. In cases where both the leader and follower entities of the constraint are changed within the same change set, the constraint can be categorized as FConstraint and as LConstraint and added to both. To avoid having duplicate constraints in the categories, the constraint is added to only one of the constraint categories. In one embodiment, such constraints are added to the LConstraint category because at least one leader entity is involved and in case of constraint violation its follower(s) can be adjusted to satisfy the constraint.

Referring again to FIG. 1, after the constraint categorization, the validator 110 starts the validation by checking the most restrictive category, i.e., FConstraints (block 111). This operation is also referred to as the Legitimacy Check of the configuration management. If a violation occurs in FConstraints, the validation is stopped and the changes are rejected. This is because the FConstraints set collects the constraints for the changes of follower entities only, and follower entities cannot impact the leader entities. On the other hand, a violation of LConstraints and/or PConstraints still allows for the adjustment of the changed configuration by modifying the respective follower or peer entities of the LConstraints or PConstraints. After validating the FConstraints, the validator 110 checks the LConstraints and PConstraints (block 112). This operation is also referred to as the Integrity Check of the configuration management. As mentioned previously, a failed Integrity Check may be resolved by auto-adjustment of the configuration.

If the validator 110 finds no constraint violation in any of the three constraint categories, the requested changes are applied to the system configuration 140. If any constraint violation is found in the LConstraints or PConstraints categories, the adjustment agent 120 uses the leadership information defined in the consistency rules 150 to determine whether an adjustment can be made to the system configuration to resolve the violation. If valid modifications can be found, the adjustment agent 120 applies the modification to the system configuration 140. Otherwise, the requested changes are rejected.

A partial validation approach has been described. In the partial validation, the constraints are filtered based on the change request. The filtered constraints include only those constraints whose constrained entities are changed in the change request. Thus, the partial validation can achieve better performance compared to the full validation by reducing the validation time. The filtered constraints can be also categorized according to the roles of the changed entities in the constraint. With the categorization, potential inconsistencies that can be handled by auto-adjustment and those which cannot be resolved by auto-adjustment can be distinguished.

The model based framework 100 (FIG. 1) has at least the following advantages. By selecting only the constraints that are relevant to the changed entities, the number of constraints needed to be checked is reduced, which results in reduction of validation time and overhead compared to the complete validation. In addition, for self-managing systems, the framework 100 is capable of identifying all the constraints necessary to keep the system configuration consistent. The adjustment agent 120 attempts to resolve the Integrity rule violation through additional modifications that satisfy the Integrity and Legitimacy rules by construction.

Figure 7:
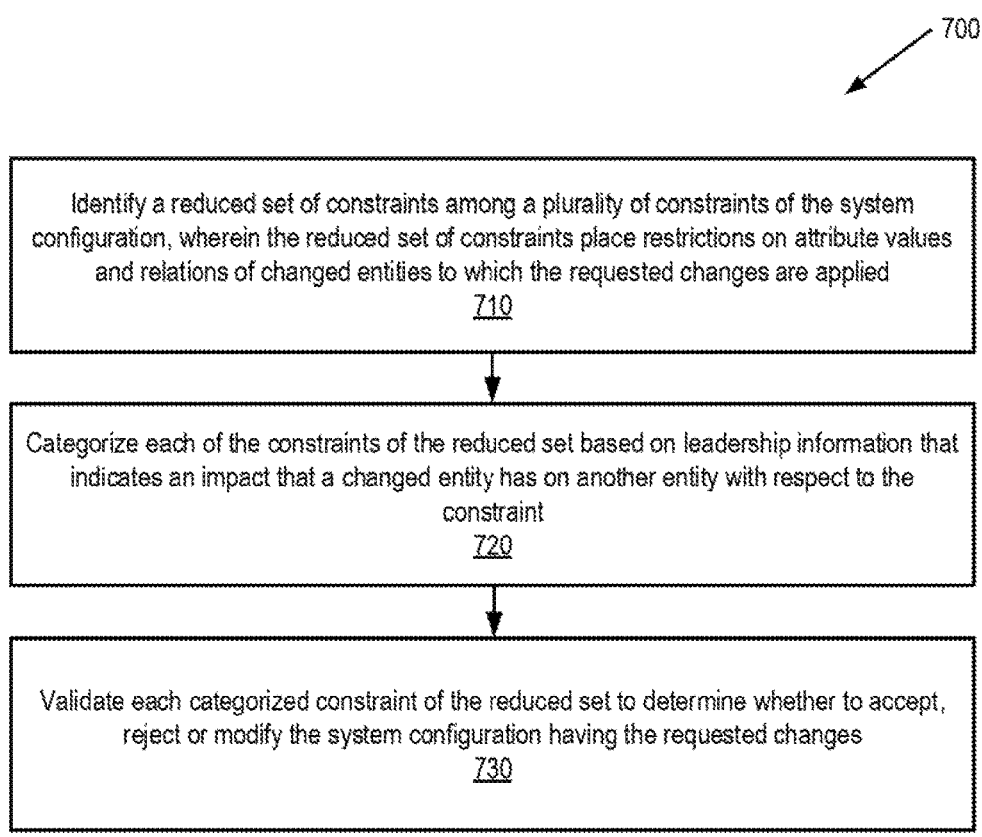
FIG. 7 illustrates a method for validating a system configuration according to one embodiment.

FIG. 7 is a flow diagram illustrating a method 700 for validating a system configuration by partially validating requested changes to the system configuration according to one embodiment. The method 700 begins at step 710 when a system (e.g., the framework 100 of FIG. 1) identifies a reduced set of constraints among a plurality of constraints of the system configuration. The reduced set of constraints places restrictions on attribute values and relations of changed entities to which the requested changes are applied. At step 720, the system categorizes each constraint of the reduced set based on leadership information. The leadership information indicates an impact that a changed entity has on another entity with respect to the constraint. At step 730, the system validates each categorized constraint of the reduced set to determine whether to accept, reject or modify the system configuration having the requested changes.

Figure 8:
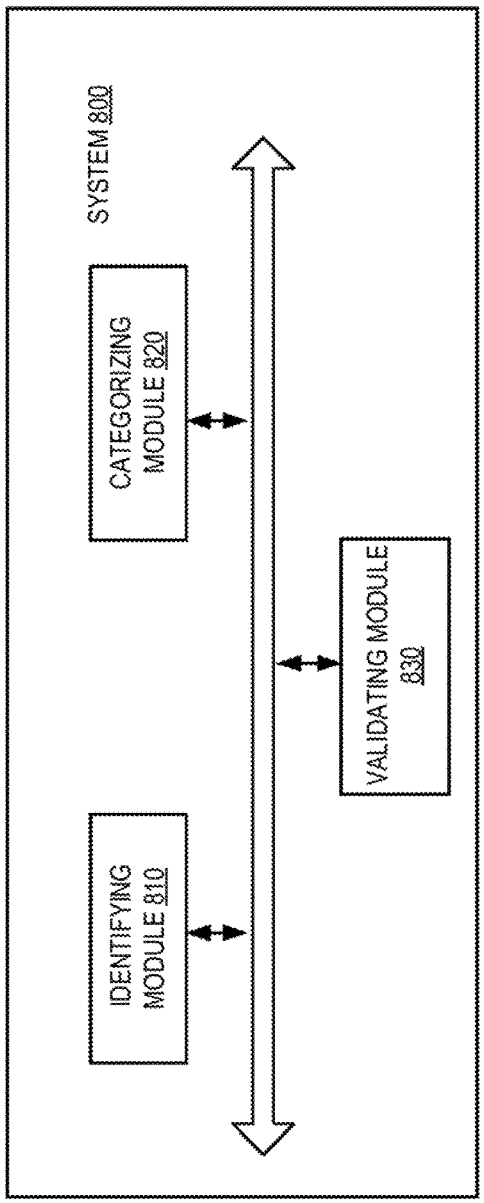
FIG. 8 illustrates a system for validating a system configuration according to one embodiment.

FIG. 8 illustrates a system 800 for validating a system configuration by partially validating requested changes to the system configuration according to one embodiment. In one embodiment, the system 800 includes an identifying module 810 adapted or operative to identify a reduced set of constraints among a plurality of constraints of the system configuration, wherein the reduced set of constraints places restrictions on attribute values and relations of changed entities to which the requested changes are applied. The system 800 also includes a categorizing module 820 adapted or operative to categorize each constraint of the reduced set based on leadership information that indicates an impact that a changed entity has on another entity with respect to the constraint. The system 800 further includes a validating module 830 adapted or operative to validate each categorized constraint of the reduced set to determine whether to accept, reject or modify the system configuration having the requested changes.

Figure 9:
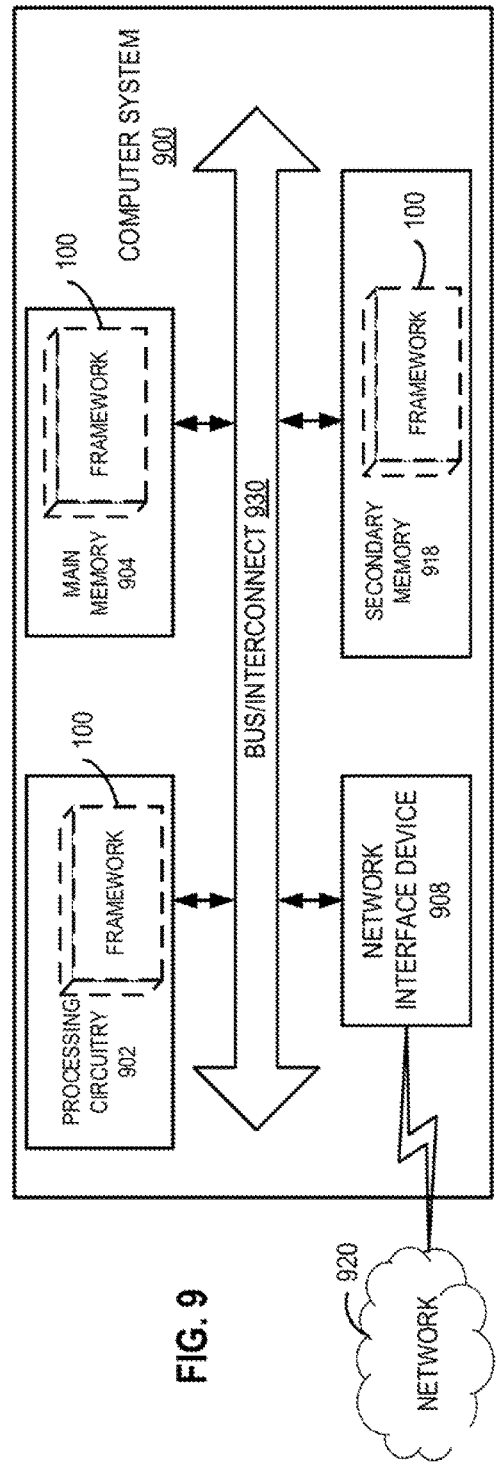
FIG. 9 illustrates a computer system for validating a system configuration according to one embodiment.

FIG. 9 illustrates a computer system 900 within which a set of instructions, for causing the machine to perform any one or more of the methodologies, e.g., methods, algorithms, steps or logic, discussed herein, may be executed. In one embodiment, the computer system 900 may be part of a networked system, and/or operate in a cloud computing environment where multiple server computers in one or more service centers collectively provide computing services on demand. While only a single machine is illustrated, the term "machine" shall also be taken to include any collection of machines (e.g., computers) that individually or jointly execute one or more sets of instructions to perform any one or more of the methodologies discussed herein.

The computer system 900 includes processing circuitry 902, such as one or more general-purpose processors, each of which can be: a microprocessor, a central processing unit (CPU), a multicore processor, or the like. The processing circuitry 902 may also be one or more special-purpose processing devices such as an application-specific integrated circuit (ASIC), a field programmable gate array (FPGA), a digital signal processor (DSP), network processor, or the like. In one embodiment, the processing device 902 is adapted or operative to execute the operations of a model based framework (e.g., the framework 100 of FIG. 1), which contains instructions executable by the processing circuitry 902 to perform the method 700 of FIG. 7.

In one embodiment, the processor circuitry 902 is coupled to one or more memory devices such as: a main memory 904 (e.g., read-only memory (ROM), flash memory, dynamic random access memory (DRAM), etc.), a secondary memory 918 (e.g., a magnetic data storage device, an optical magnetic data storage device, etc.), and other forms of computer-readable media, which communicate with each other via a bus or interconnect 930. The memory devices may also include different forms of ROMs, different forms of random access memories (RAMs), static random access memory (SRAM), or any type of media suitable for storing electronic instructions. In one embodiment, the memory devices may store the code and data of the framework 100, which may be entirely or partially stored in one or more of the locations shown as dotted boxes and labeled by the reference numeral 100, or in other location(s) not shown in FIG. 9.

The computer system 900 may further include a network interface device 908. A part or all of the data and code of the framework 100 may be transmitted or received over a network 920 via the network interface device 908.

In one embodiment, the computer system 900 stores code (composed of software instructions) and data using computer-readable media, such as non-transitory tangible computer-readable media (e.g., computer-readable storage media such as magnetic disks; optical disks; read only memory; flash memory). The term "non-transitory computer-readable medium" should be taken to include a single medium or multiple media (e.g., a centralized or distributed database, and/or associated caches and servers) that store the one or more sets of instructions. The computer system 900 may also receive and transmit (internally and/or with other electronic devices over a network) code and data using transitory computer-readable transmission media (e.g., electrical, optical, acoustical or other form of propagated signals).

In one embodiment, a non-transitory computer-readable medium stores thereon instructions that, when executed on one or more processors of the computer system 900, cause the computer system 900 to perform the method 700 of FIG. 7.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method for partially validating a modified system configuration, the method comprising:
   identifying constraints relevant to changed entities of the modified system configuration;
   categorizing each constraint of the reduced set of constraints based on roles of the changed entities in the reduced set of constraints;
   validating each categorized constraint to determine whether the modified system configuration is valid;
   determining whether to reject the modified system configuration based on results of validation; and
   adding leadership information to a constraint profile to extend information captured by the constraints and to express the way constrained entities impact each other;

wherein the leadership information includes information of entity roles of leader, follower and peer, wherein:
the leader has influence on the follower and the leader is not allowed to adjust to changes of the follower,
the follower cannot impact the leader, and
the peer and another peer have equal influence over each other.

2. The method of claim 1, wherein the step of validating further comprises
performing legitimacy checks on the follower category of the categorized constraints to determine whether to accept or reject the modified system configuration.

3. The method of claim 1, wherein the step of validating further comprises:
validating modifications before applying the modifications to a computer system such that the consistency of the configuration is not violated.

4. A system for partially validating a modified system configuration, comprising:
a memory; and
processing circuitry coupled to the memory, the processing circuitry adapted to:
identify constraints relevant to changed entities of the modified system configuration;
categorize each constraint of the reduced set of constraints based on roles of the changed entities in the reduced set of constraints;
validate each categorized constraint to determine whether the modified system configuration is valid;
determine whether to reject the modified system configuration based on results of validation; and
add leadership information to a constraint profile to extend information captured by the constraints and to express the way constrained entities impact each other;
wherein the leadership information includes information of entity roles of leader, follower and peer, wherein:
the leader has influence on the follower and the leader is not allowed to adjust to changes of the follower,
the follower cannot impact the leader, and
the peer and another peer have equal influence over each other.

5. The system of claim 4, wherein the processing circuitry is further adapted to:
perform legitimacy checks on the follower category of the categorized constraints to determine whether to accept or reject the modified system configuration.

6. The system of claim 4, wherein the processing circuitry is further adapted to:
validate modifications before applying the modifications to the system such that the consistency of the configuration is not violated.

* * * * *